3,046,972
COUNTER TYPE COOKING AND WARMING
EQUIPMENT
Phillip M. Pappas, 2318 Blue Bonnet, Houston, Tex.
Filed July 27, 1959, Ser. No. 829,752
3 Claims. (Cl. 126—37)

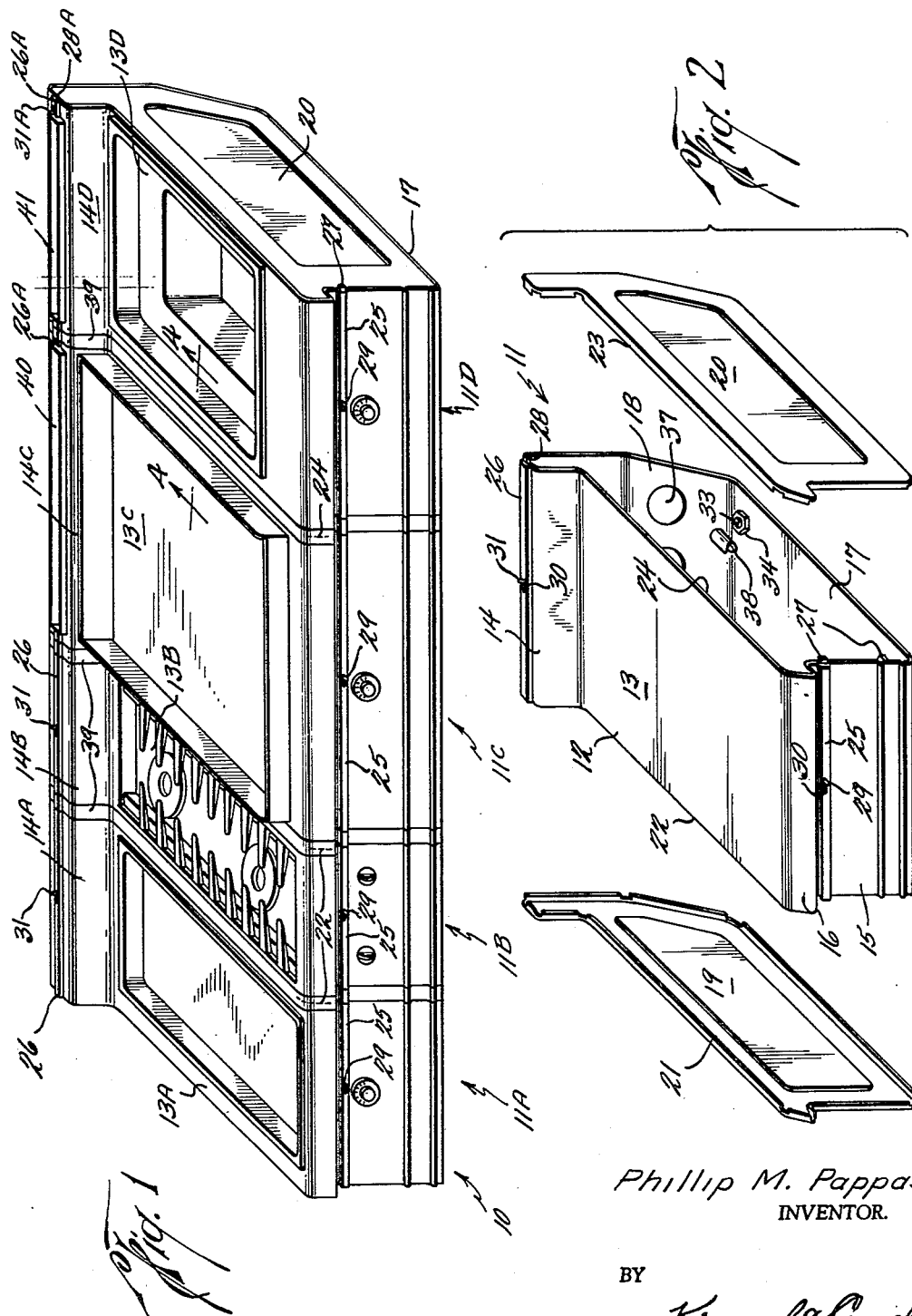

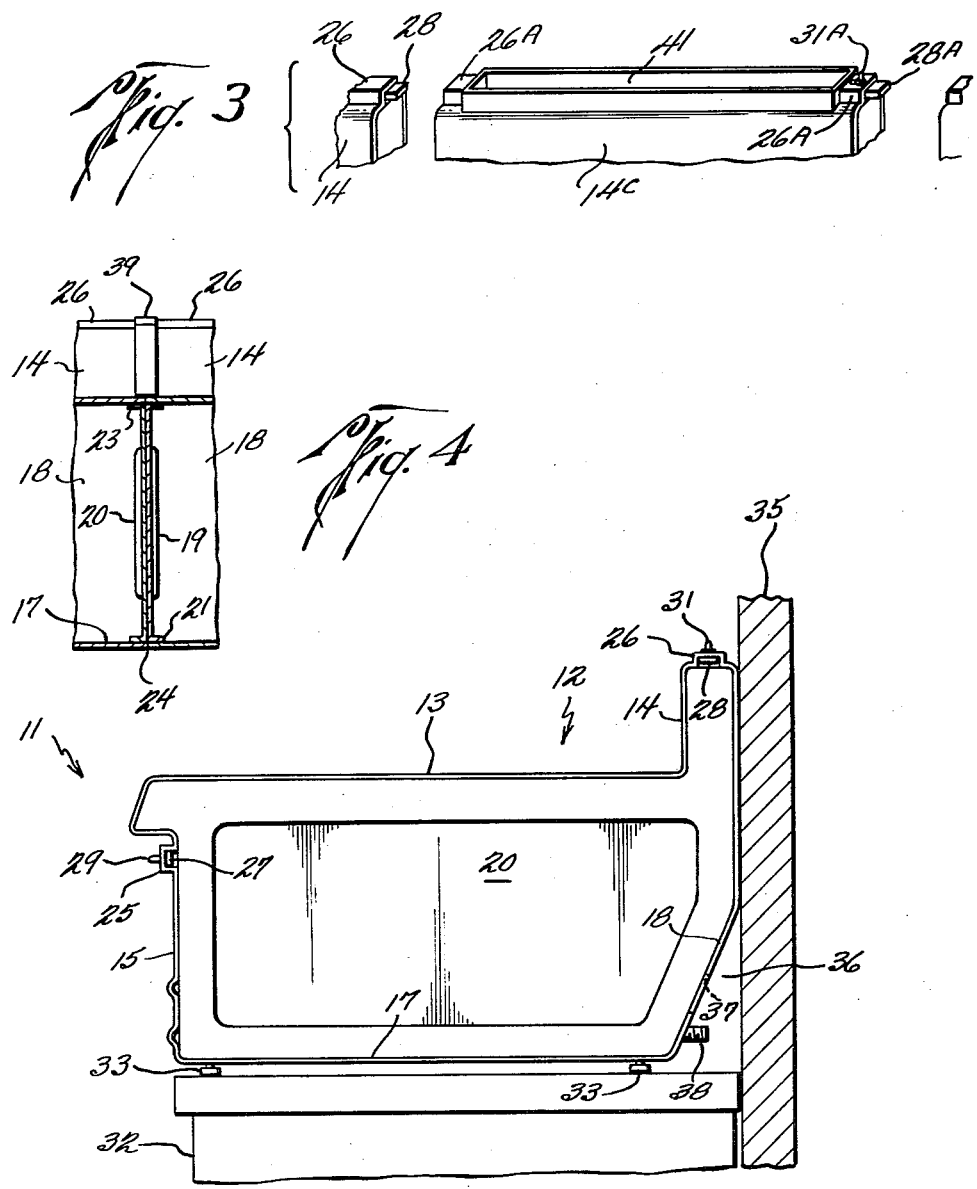

The present invention relates to counter type cooking and warming equipment such as is used in commercial kitchens.

The banking or placement of commercial cooking equipment in side-by-side relation has long presented a sanitation and cleaning problem to the restaurant industry. This problem exists due to the cracks and crevices between each of the various cooking units when arranged in side-by-side relation. In most cooking and warming functions food vapors and moistures infiltrate the cracks and crevices, carrying grease therewith, and additionally, grease tends to splatter directly into such cracks and crevices. The condensed and cooled material in the cracks and crevices builds up and provides a germ breeding accumulation in such a position that it is impossible to remove without first moving the units apart. The movement of the units with respect to each other is difficult, if not impossible, with gas units which are piped into place, as well as with high wattage electric units which are connected by electric wire conduits to the source of power. Even with plug-in type electric units, the weight of the average commercial unit makes moving the unit so difficult that even the most sanitation-minded management will not insist upon thorough cleaning except upon rare occasion.

This cleaning and sanitation problem between commercial cooking units has led some restaurant operators to have their associated cooking units custom built into a continuous stainless steel counter or table top with holes or openings cut out for the units to drop into. This method is obviously expensive in comparison with standard production made matching units and requires field wiring, plumbing, plus cutouts and mountings for the vertically mounted thermostats and controls. Further, such custom mounted units make repair, replacement and future additions very costly compared with production made matching units, wherein one unit can be easily removed to facilitate repair or replacement as required.

With the foregoing problems in view, the primary object of my invention is to provide commercial cooking and warming units having the transverse surfaces of each unit identically matching to eliminate cracks and crevices between the units with the hairline crevice sealed by a heat resisting tape to completely eliminate infiltration of grease, food moisture and vapors into inaccessible positions between the units.

Another object of the invention is to provide a cooking unit structure such that individual units in a bank of units may be readily removed and replaced as required by wear and repair.

A still further object of the invention is to provide a cooking unit structure of the class described above which is inexpensive to manufacture, simple to assemble and which provides a sanitary cooking apparatus devoid of germ breeding crevices and traps.

Other objects and advantages will become apparent in the following specification when considered in light of the attached drawings, in which:

FIGURE 1 is a perspective view of the invention;

FIGURE 2 is an exploded perspective view of one of the units illustrated in FIGURE 1;

FIGURE 3 is an enlarged fragmentary exploded perspective view of the upper rear portion of the units;

FIGURE 4 is an enlarged fragmentary vertical sectional view taken along the line 4—4 of FIGURE 1, looking in the direction of the arrows; and FIGURE 5 is a side elevation of the invention.

Referring now to the drawings in detail wherein like reference characters indicate like parts throughout the several figures, the reference numeral 10 indicates generally a counter type cooking apparatus constructed in accordance with the invention.

The cooking apparatus 10 includes a plurality of units indicated generally at 11 in FIGURE 2. Each unit 11 consists of a casing 12 having a generally horizontal top wall 13, an upstanding peninsular shaped back portion 14, a front wall 15, and a front overhang 16. The casing 12 also has a bottom wall 17 and an upwardly and rearwardly sloping rear wall 18 extending to the upstanding portion 14.

A left side panel 19 is provided for closing the left side of the casing 12 and a right side panel 20 is provided for closing the right side of the casing 12. The left side panel 19 is formed to fit the side of the casing 12 and has a peripheral flange 21 formed thereon and extending perpendicularly therefrom. The panel 19 fits into the casing 12 so that the sheared edge 22 on the left side thereof is even with the outermost portion of the left side panel 19.

The right side panel 20 is formed identically with the left side panel 19 in reversed form and has a peripheral flange 23 formed thereon and extending perpendicularly therefrom. The panel 20 fits into the right side of the casing 12 so that the sheared edge 24 thereof extends out even with the outermost portion of the right side panel 20. The casing 12 is secured to the flanges 21, 23 of the panels 19, 20 by spotwelding or other suitable means.

A generally rectangular horizontal channel 25 is formed on the front wall 15 underlying the overhang 16. A generally rectangular horizontal channel 26 is formed on the top of the upstanding portion 14 and the channels 25, 26 extend transversely of the casing 12. A slide bar 27 is slidably mounted in the channel 25 and a slide bar 28 is slidably mounted in the channel 26. A handle 29 is rigidly mounted on the slide bar 27 and extends forwardly through a slot 30 in the channel 25 to permit the bar 27 to be slid within the channel 25 a limited amount. A handle 31 is rigidly secured to the slide bar 28 and extends upwardly through a slot 30 formed in the channel 26 to permit the slide bar 28 to be slid within the channel 26 as required.

In FIGURE 5 the unit 11 is illustrated supported on a base cabinet 32 with a plurality of threaded bolts 33 mounted in nuts 34 secured to the bottom wall 17. By adjusting the bolts 33, the unit 11 can be leveled for proper alignment with adjacent units. The cabinet base 32 is positioned adjacent a wall 35 so that the sloping rear wall 18 forms a triangular space 36, with the wall 35 behind the base cabinet 32 through which gas pipes and the like may extend. A plurality of openings 37 formed in the rear wall 18 admit air to the casing 12 to support combustion in gas burners and similar equipment. Of course, the triangular space 36 will permit wires to be run therethrough for servicing electric equipment.

A gas pipe 38 is illustrated projecting through the rear wall 18 to service gas equipment in the unit 11.

A plurality of units 11 are arranged in edge-to-edge relation with the slide bars 27, 28 of one unit projecting into the channels 25, 26 of the next adjacent unit, maintaining the units 11 in alignment. A metallic sealing tape 39 overlaps the abutting sheared edges 22, 24 of adjacent units 11 and seals one unit 11 to the next adjacent unit 11 to prevent material from lodging between the units.

In FIGURE 1 a plurality of substantially identical units 11A, 11B, 11C and 11D are illustrated in side-by-side relation connected together as described above. The units 11A, 11B, 11C and 11D vary in transverse width, in their top walls 13A, 13B, 13C and 13D and in their upstanding rear portions 14A, 14B, 14C and 14D. The top wall 13A is formed to receive a removable warming unit with the top wall 13B being an open top burner section. The top wall 13C is adapted for the positioning of a griddle thereon, and the top wall 13D is formed with a well for the reception of a deep fat fryer.

The upstanding portions 14A, 14B are identical to the upstanding portion 14, while the upstanding portions 14C and 14D are each provided with a generally rectangular upstanding port 40, 41 to provide for exhausting combustion products from the gas burners. The ports 40, 41 extend through the top of the upstanding portion 14, leaving a relatively short generally rectangular channel 26A on each side thereof. A relatively short slide bar 28A is mounted in one of the channels 26A and controlled by a handle 31A rigidly connected thereto.

With the connections illustrated between the adjacent units 11, it can be readily seen that any one of the units 11 may be disconnected and removed from between the adjacent units 11 to permit it to be repaired or replaced. It should also be noted that new units 11 can be added adjacent to the previously installed group of units 11 with a minimum of required changes.

The front overhang 16 on the front wall 15 of each unit provides maximum horizontal working depth and yet permits installation of the units in standard depth cabinets or stands. The overhang also strengthens the cabinet structure and protects protruding control knobs from damage in shipment or in use.

Having thus described the preferred embodiments of the invention, it should be understood that numerous structural modifications and adaptations may be resorted to without departing from the appended claims.

What is claimed is:

1. Cooking apparatus comprising a plurality of independent cooking and warming units, each unit having substantially identical profile configuration and open sides, each unit having top, bottom, front and rear walls, said profile configuration being substantially rectangular in shape with backsplash and front overhang portions formed by an upwardly extended peninsular shaped rear portion and a forward extended peninsular shaped front portion, respectively, with a diagonal lower rear corner portion cutaway from the rear wall to the bottom wall of each unit adapted to provide a recessed transverse passage for supply piping, identical dimensioned unit sides having continuous perimeter flanges perpendicular to the vertical planes of said sides with said perimeter flanges extending inward toward the center of said units and in contact with the inner periphery of the open sides of the units to support and form an attachment to the inner surfaces of said units, said units having a plurality of co-planar outwardly formed horizontal channels having slots therein, said channels being provided with snug fitting slide bars within each unit with hand operable knob means attached to said slide bars through said slots provided in said channels with said hand operated knob and associated open slot providing for the limited horizontal extension of said slide bars from each unit to each adjacent unit within said channels to align said transverse outer surfaces in a co-planar manner holding said adjacent units together, strip means bridging over the surface crack presented by abutted edges of the outer transverse co-planar surface coverings of adjacent units with said strip means having heat resistant adhesive on the underside thereof to provide leak-proof sanitary surface joints between adjacent units with said strip means pressed in place to bridge over and seal said exposed cracks.

2. Commercial cooking apparatus comprising a plurality of independent cooking units with cabinet sides having perimeter flanges perpendicular to the vertical faces of said sides with said perimeter flanges extending inward toward the center of said units, said sides following a fixed configuration comprising a horizontal top portion, an upwardly extending peninsular shaped backsplash portion, and a forwardly extending horizontal base, the vertical back with the diagonal lower rear portion cut away from the vertical back to the base adapted to provide a recessed transverse passage for concealed supply piping, a vertically extending forwardly and outwardly extending peninsular shaped front overhang portion for added top surface depth, outer transverse casings supported by said cabinet sides and fixedly attached to the outer surfaces of said perimeter flanges, said transverse casing having outer sheared edges extended flush with the vertical faces of said cabinet sides, said units having a plurality of identically located co-planar outward horizontal extending channels having open slot means therein, said channels forming enclosed passageways between units placed in a co-planar side-by-side relation, snug fitting slide operated bar means arranged within said channels of each unit to engage and keep in alignment each adjacent unit, knob operating means attached to said bar means extending through said open slot means for the limited extension of said snug fitting slide bars into said enclosed channels of each adjacent unit to align and hold adjacent units snugly together, strip means provided to bridge the apertures of the abutted sheared edges of the transverse casings, said strip means being provided with heat resistant adhesive on the underside thereof to prevent leakage or infiltration of grease or food liquids between adjacent units.

3. Cooking apparatus comprising a plurality of independent cooking and warming units for side by side placement in a group with each side of each unit substantially conforming to a fixed configuration, said configuration being substantially rectangular in shape with a diagonal lower rear corner portion cut away from the rear wall to the bottom wall of each unit, adapted to provide a recessed transverse passage for supply piping, said configuration being provided by identically dimensioned cabinet sides having continuous perimeter flanges perpendicular to the vertical planes of said sides with said flanges extending inward toward the center of said units, outer transverse surface coverings having their undersides attached to and supported by said flanges, formed with similar configuration and having outer sheared edges, said outer transverse coverings extending the full width of each unit with said outer transverse coverings having a plurality of co-planar outwardly formed horizontal channels having open slots therein, snug fitting slide bars in said channels within each unit, hand operable knob means attached to said slide bars and extending through said slots, said hand operable knob means and their associated open slots providing for the limited horizontal extension of said slide bars from each unit to each adjacent unit within said channels to align said transverse outer surfaces in a co-planar manner, holding said units together with a minimum exposed surface crack between abutted sheared edges of said co-planar outer transverse surface coverings of adjacent units, strip means having heat resistant adhesive on the underside thereof sealing said crack to provide leakproof sanitary surface joints between adjacent units, said strip means being pressed in place.

References Cited in the file of this patent

UNITED STATES PATENTS

| | | |
|---|---|---|
| 268,871 | Danforth | Dec. 12, 1882 |
| 1,245,918 | Himmel | Nov. 6, 1917 |
| 2,121,190 | Fellowes | June 21, 1938 |
| 2,464,160 | Stanitz | Mar. 8, 1949 |
| 2,576,409 | Michaelis et al. | Nov. 27, 1951 |